(12) United States Patent
Wills et al.

(10) Patent No.: US 8,561,951 B2
(45) Date of Patent: Oct. 22, 2013

(54) GARDEN HOSE GUIDE

(75) Inventors: Robert Patrick Wills, Davenport, FL (US); David M. Gauch, Sierra Vista, AZ (US)

(73) Assignees: Robert P. Wills, Kissimmee, FL (US); David M. Gauch, Sierra Vista, AZ (US)

( * ) Notice: Subject to any disclaimer, the term of this patent is extended or adjusted under 35 U.S.C. 154(b) by 0 days.

(21) Appl. No.: 13/338,082

(22) Filed: Dec. 27, 2011

(65) Prior Publication Data

US 2012/0168572 A1    Jul. 5, 2012

(51) Int. Cl.
| A62C 13/76 | (2006.01) |
| A62C 37/50 | (2006.01) |
| B05B 15/06 | (2006.01) |
| A47G 29/00 | (2006.01) |
| F16B 15/00 | (2006.01) |
| F16B 45/00 | (2006.01) |

(52) U.S. Cl.
USPC .................................. 248/76; 248/71; 248/85

(58) Field of Classification Search
USPC ................. 248/218.4, 227.3, 302, 71, 76, 75, 248/80–88; 256/10; 174/158 F; D30/154
See application file for complete search history.

(56) References Cited

U.S. PATENT DOCUMENTS

| 763,594 | A | * | 6/1904 | Chubb | 248/87 |
| 1,097,746 | A | * | 5/1914 | Benton | 248/80 |
| 1,479,532 | A | * | 1/1924 | Coleman | 248/87 |
| 1,591,374 | A | * | 7/1926 | Hammill | 248/87 |
| 1,797,381 | A | * | 3/1931 | Trimble | 248/211 |
| 2,447,444 | A | * | 8/1948 | Waite | 52/157 |
| 2,456,302 | A | * | 12/1948 | Mocnik | 248/468 |
| D554,810 | S | * | 11/2007 | Head | D30/154 |
| 2008/0000430 | A1 | * | 1/2008 | Petersen | 119/786 |

* cited by examiner

*Primary Examiner* — Daniel J Troy
*Assistant Examiner* — Muhammad Ijaz

(57) ABSTRACT

The garden hose guide includes a spiral stake member terminating at a lower end in a sharpened point. A hose support and guide define an upper portion of the stake member. The hose support and guide includes a roller, a first support arm and a hose guide arm disposed perpendicular to the first support arm. A conventional washer is attached to the stake member and is utilized to manipulate the stake for securing the stake in the ground.

5 Claims, 3 Drawing Sheets

GARDEN HOSE GUIDE

BACKGROUND OF THE INVENTION

1. Field of the Invention

The present invention generals relates to support structure, and particularly to structure for supporting and guiding a garden hose.

2. Description of the Related Art

It is almost a given that the process of extracting a garden hose from a reel/hanger and extending that hose across a lawn or garden area will leave damaged flora or displaced yard accessories in its wake. A number of devices in the related art have been designed to alleviate the effects of the above-described scenario. However, these devices have been proven to be less than satisfactory. The art would certainly welcome a device that would enable a hose to be efficiently pulled therethrough without twisting or crimping and that would also prevent the hose from causing damage to the garden plants. Thus, a garden hose guide solving the aforementioned problems is desired.

SUMMARY OF THE INVENTION

The garden hose guide includes a spiral rod member terminating at a lower end in a sharpened point. A hose support and guide define an upper portion of the rod member. The hose support and guide includes a roller, a first support arm, and a hose guard arm oriented perpendicular to the first support arm. A conventional washer is attached on its edge to the upper end of the stake member and is utilized to manipulate the stake for securing the stake in the ground. Accordingly, the invention presents a hose support device that can be easily secured in almost any kind of soil. The device enables a garden hose to be efficiently drawn therethrough without twisting or crimping while elevating the hose above flowers and other flora. The invention provides for improved elements thereof in an arrangement for the purposes described that are inexpensive, dependable, and fully effective in accomplishing their indented purposes.

These and other features of the present invention will become readily apparent upon further review of the following specifications and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
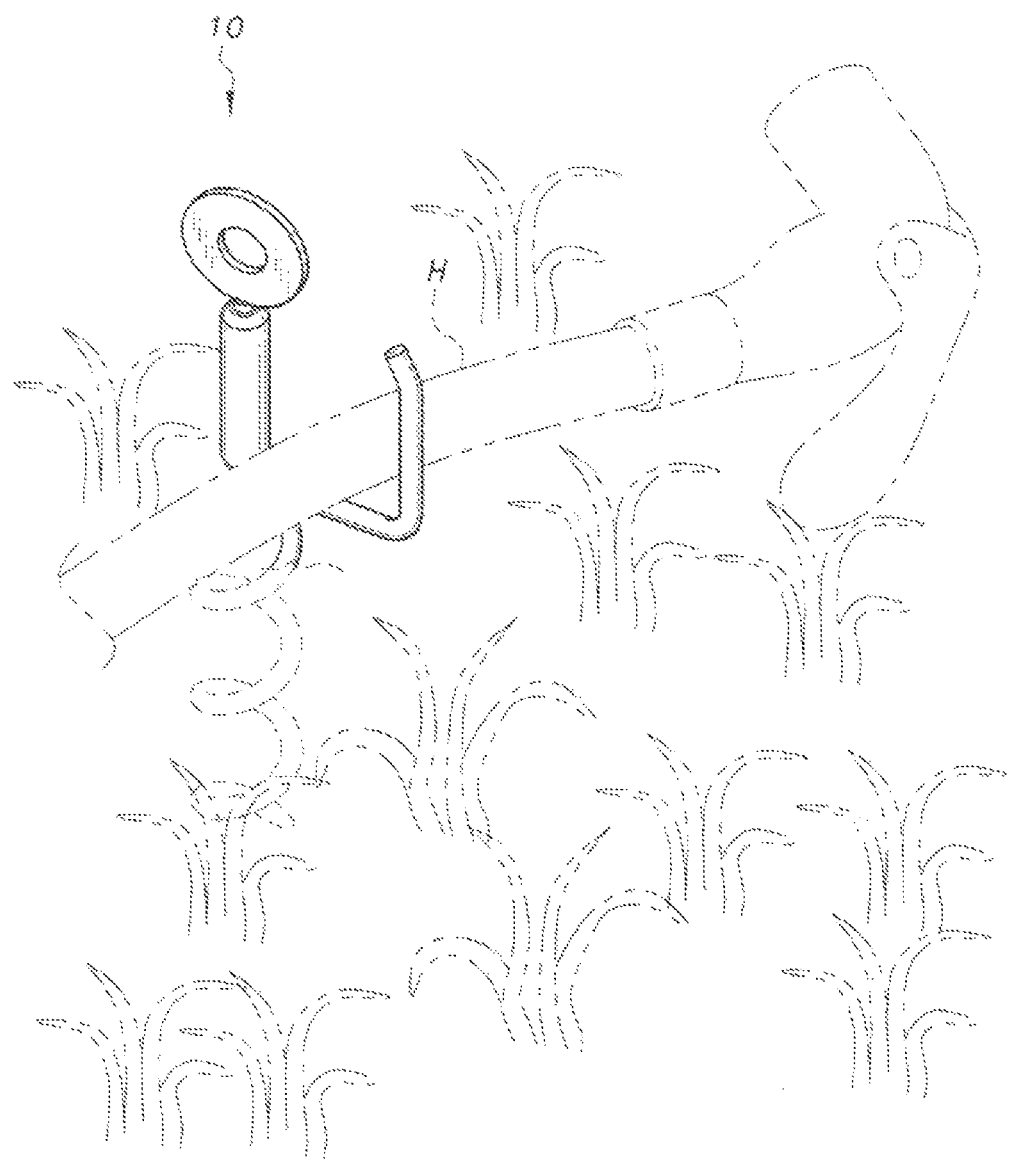
FIG. 1. Is an environmental, perspective view of a first embodiment of a garden hose guide according to the present invention.
Figure 2:
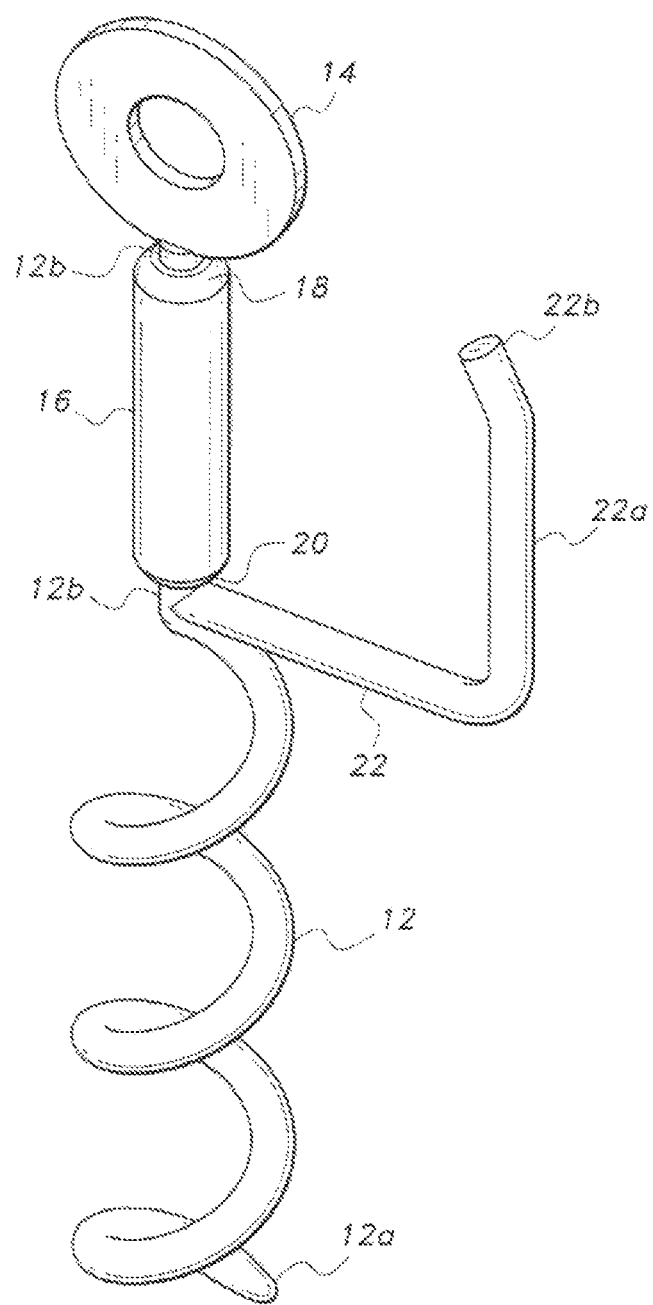
FIG. 2 Is a perspective view of the garden hose guide in FIG. 1.

Referring to FIGS. 1 and 2, a first embodiment of the garden hose guide 10 comprises a rod member 12 that is spirally configured along a lower portion of its length and terminates at its lower end in a sharpened point 12a. At its upper end, the rod member 12 transitions from a spiral to a straight upper portion 12b. A conventional washer 14 is affixed on its edge to the upper end of the straight upper portion 12b. A tube 16 is mounted for rotation along the axis of the straight upper portion 12b. Washers 18 and 20 are welded to the top and bottom of the tube 16 to facilitate rotation and enhance stability. A hose support arm 22 is affixed to the straight upper portion 12b just above the transition area and extends a distance therefrom perpendicular to the axis of the straight upper portion 12b. The hose support arm 22 is formed with a hose guard portion 22a. The hose guard portion 22a extends perpendicularly from the hose support arm 22 and parallel to the axis of the straight upper portion 12b. The hose guard portion 22a terminates in a slightly angled tub or segment 22b that is angled toward the straight upper portion 12b. As presently contemplated, all parts are fabricated from steel and attachments are welded. It is recognized however, that other materials and means of attachment may be employed, if suitable.

In use, the garden hose support guide 10 is fixed for supporting a hose by placing the lower pointed end 12a in the ground (piercing) at a desired location. Turning the device in a proper direction (clockwise for right-handed spirals) causes the spiral portion to advance in a bit-like or auger fashion into the ground, thereby securely positioning the device in the ground. The washer 14 functions as a handle for applying the torsional forces necessary to advance the device into the ground. After the device is sufficiently embedded, a hose H is disposed on the hose support arm 22 for support thereon. The tube 16 functions as a roller to enhance advancement of the hose H. The hose guard portion 22a prevents the hose from falling from the device.

Figure 3:
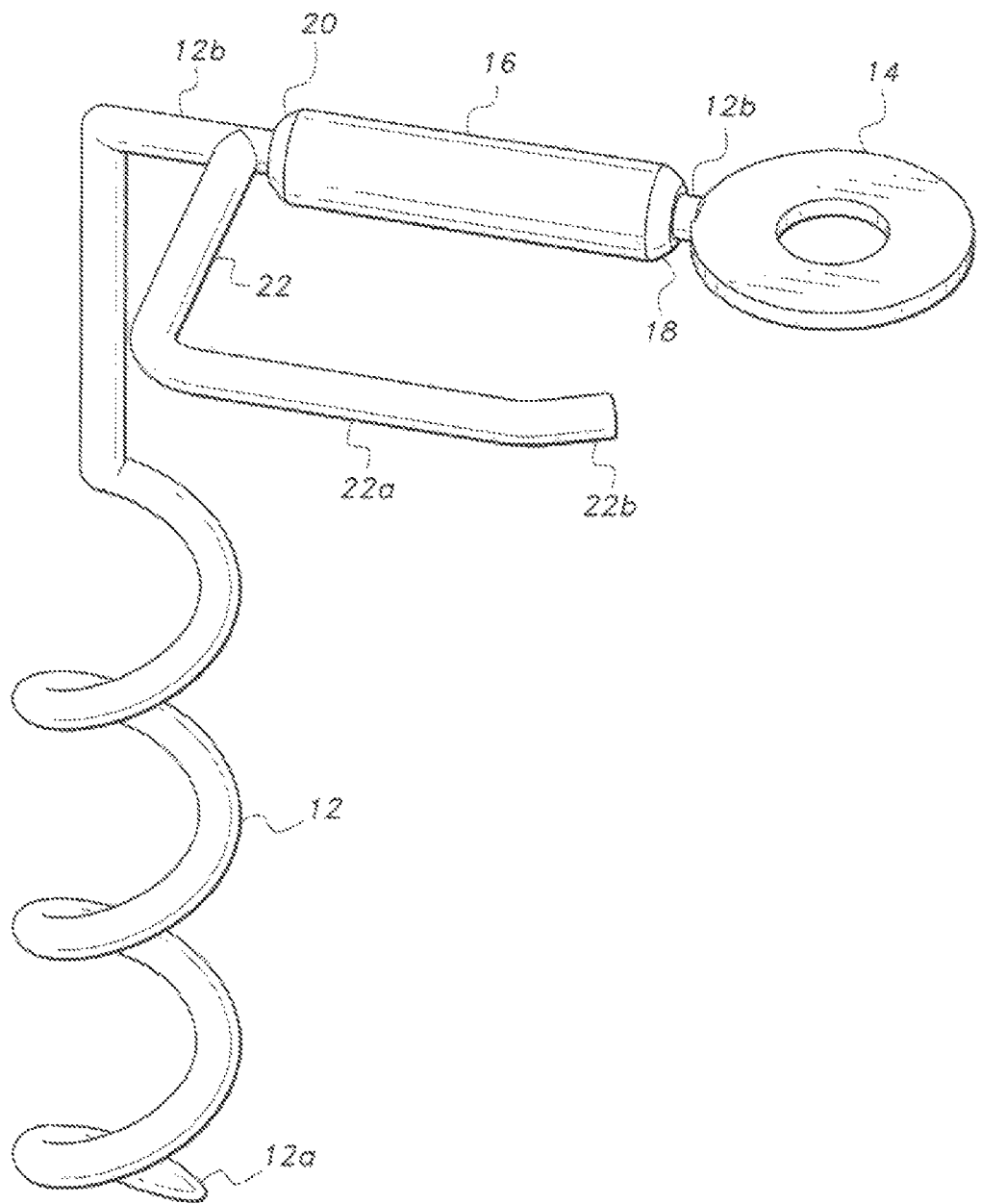
FIG. 3 is a perspective view of a second embodiment of a garden hose guide according to the present invention.

FIG. 3 illustrated an embodiment of the garden hose guide that is especially advantageous when it is desired to support the hose over a flowerbed or the like. In this embodiment, the upper portion 12b of the rod is L-shaped so that the tube 16 will have a rotational axis parallel to the ground when the guide is embedded in the ground. The hose will be supported directly on the tube 16 for easy advancement.

It will be understood that any form of ring or rigid loop may be used instead of a washer 14, or any other form of handle (e.g. a T-bar) that provides sufficient leverage for twisting the spiral portion of the rod into the ground may be used in lieu thereof.

It is also understood that the present invention is not limited to the embodiments described above, but encompasses any and all embodiments within the scope of the following claims.

We claim:

1. A garden hose guide, comprising:
    a monolithic rod member having a rigid helical shaped lower portion and a straight upper portion wherein the upper portion and lower portion are made from a same material, wherein the upper portion comprises an upper end; wherein said rigid helical shaped lower portion is configured to screw into the ground and anchor the garden hose guide;
    a tube member rotatably mounted on the upper portion of said rod member to allow reduced friction during operation; wherein said tube member comprises an upper dome shaped member affixed to a proximal end of said tube member and a lower dome shaped member affixed to a distal end of said tube member, said upper and lower dome shaped members comprise through-holes to receive said upper portion;
    a support arm comprising a first portion, a second portion and a third portion, wherein the first portion terminates at the second portion, and the second portion terminates at the third portion, said first portion is arranged in a transverse direction to the upper portion of the rod member and attached generally between said upper portion and said lower portion, said second portion is arranged at a substantially 90 degree bend, angled towards and generally parallel with said upper portion and said tube member, and said third portion is angled inward towards said tube member; wherein a space between the said tube member and said support arm is configured to allow the passage of a garden hose; and a handle is centrally attached to said upper end of said upper portion along a longitudinal axis of said upper portion of said rod member.

2. The garden hose guide according to claim 1, wherein the lower portion of said rod member terminates in a pointed, sharpened end with an length being one half of the overall entire garden hose guide so as to provide sufficient anchoring when screwed into the ground.

3. The garden hose guide according to claim 2, wherein said upper and said lower dome members are washers.

4. The garden hose guide according to claim 3, wherein said upper and said lower dome members are permanently affixed to said tube member.

5. The garden hose guide according to claim 4, wherein said handle is a washer.

* * * * *